United States Patent [19]

Phillips

[11] 4,238,430

[45] Dec. 9, 1980

[54] METHOD FOR FORMING EXPANDED CELLULAR VOLCANIC ASH

[75] Inventor: Harold L. Phillips, Oochita Lake, N. Mex.

[73] Assignee: United States Vacuumite Corporation, Irving, Tex.

[21] Appl. No.: 61,943

[22] Filed: Jul. 30, 1979

[51] Int. Cl.$^3$ ............................................. B29C 23/00
[52] U.S. Cl. ........................................................ 264/15
[58] Field of Search ............................................ 264/15

[56] References Cited

U.S. PATENT DOCUMENTS

| | | | |
|---|---|---|---|
| 3,171,714 | 3/1965 | Jones et al. | 264/15 |
| 3,197,810 | 8/1965 | Bildstein | 264/15 |
| 3,272,615 | 9/1966 | Hoffman et al. | 264/15 |
| 3,323,888 | 6/1967 | Searight et al. | 264/15 |

Primary Examiner—Donald E. Czaja
Assistant Examiner—James R. Hall

[57] ABSTRACT

Disclosed is an apparatus and method for expanding particulate volcanic ash to produce an expanded substantially monocellular product having a loose bulk density of about 0.5 to about 15 pounds per cubic foot. The apparatus includes an enclosed vessel containing a zone heated to about 930° C. to about 1100° C. by a substantially horizontally projecting flame. The flame may be deviated from horizontal to control the residence time of the ash particles in the heated zone. The pressure in the vessel is maintained at least 10 millimeters of mercury less than atmospheric.

3 Claims, 1 Drawing Figure

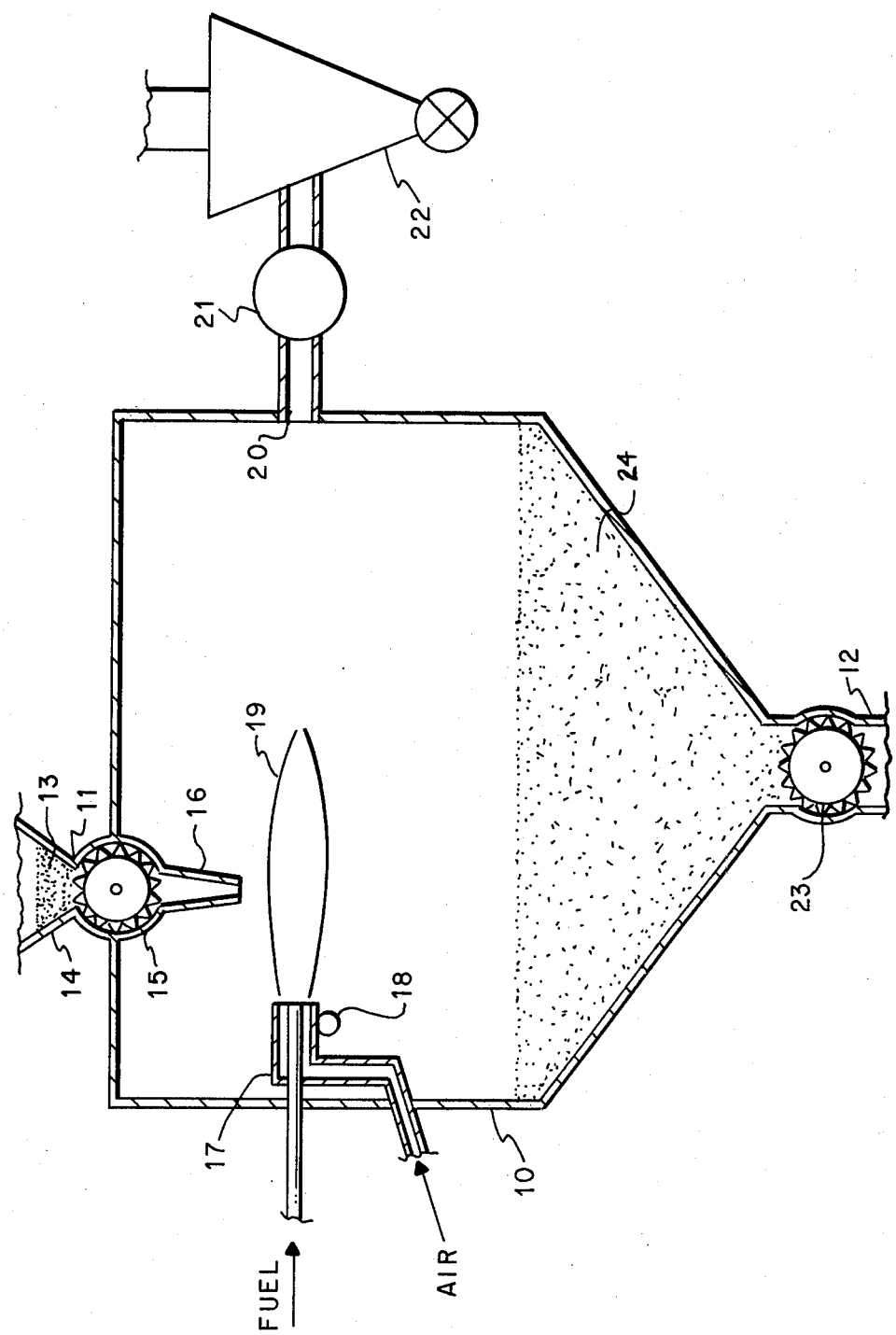

METHOD FOR FORMING EXPANDED CELLULAR VOLCANIC ASH

This invention relates to methods for forming expanded hollow cellular particles of volcanic ash. More particularly, it relates to methods for converting vesicular volcanic ash particles to substantially spherical enclosed hollow bodies by heating such volcanic ash particles in a controlled environment at reduced pressures to expand the vesicular bodies and produce enclosed substantially monocellular bodies which have an internal gas pressure less than atmospheric at room temperature. The expanded product has an extremely low bulk density and, because of the partial vacuum in the expanded spherical particles, extremely high thermal and acoustic insulating properties.

Volcanic ash in the form of particulate powder or sand is found in naturally-occurring deposits at various locations throughout the world. Such volcanic ash, in its naturally-occurring form, is particulate shards of vesicular glassy material comprising alumina, silica and aluminum silicates. The particulate ash used in connected with the invention differs from rhyolitic rock in the manner in which it was naturally formed. Rhyolitic rock is usually found in solid deposits and, while it is vesicular, has a much higher loose bulk density than naturally-occurring particulate volcanic ash. The particulate volcanic ash used in connection with this invention is volcanic material which was deposited in water and thus frothed to produce a deposit of particulate small-grained glassy shards which are highly vesicular. The particulate material ordinarily is in the form of shards which will pass through sieves of 60 mesh size. Therefore the naturally-occurring shards are generally no more than about 0.01 inch in at least one dimension. The chemical composition of such volcanic ash may vary slightly from different deposits, but the material is generally silica ($SiO_2$), alumina ($Al_2O_3$) and/or aluminum silicates with minor proportions of oxides and halides of magnesium, iron sodium, potassium, sulfur and/or calcium. Various other trace elements may be found therein and frequently the shards contain interstitial water. The particulate ash used in connection with the invention has a naturally-occurring loose bulk density of about 40 to about 65 pounds per cubic foot as contrasted to the loose bulk density of crushed rhyolitic rock which is generally about 160 pounds per cubic foot.

Because volcanic ash consists substantially of alumina and silica or aluminum silicates, it exhibits desirable thermal insulating properties. Since it is plentiful, essentially non-combustible and chemically inert, attempts have been made to use volcanic ash as an insulating medium. However, since the composition is particulate and exhibits a relatively high loose bulk density, its commercial uses in this field have been quite limited. Attempts have been made to reduce the bulk density of volcanic ash particles, particularly crushed rhyolitic rock, by heating the particles to expand contained gasses, such as water vapor, thereby exploding the shards to produce popped flakes or the like which then exhibit a lower bulk density. However, exploded ash particles are subject to packing and agglomeration and do not exhibit the insulating properties desired. Furthermore, the popped flake particles tend to be hydroscopic which hinders their use in many industrial applications.

In accordance with the present invention particulate volcanic ash is heated under controlled conditions to produce substantially spherical hollow particulate bodies which remain finely divided and contain an internal gas pressure less than atmospheric at room temperature. The glassy bodies are not porous but retain their individual spherical and substantially smooth outer surface. Therefore the expanded product of the invention exhibits extremely low bulk density, extremely high thermal insulation properties and is finely divided. It is thus useful in various applications requiring a finely divided insulating material and, since it is essentially chemically inert, may be used as an expander for forming reduced density solid materials such as concrete and the like.

The expanded product may be formed from various widely available deposits of particulate ash. The process and apparatus employed are relatively simple and inexpensive to manufacture and operate; therefore the expanded product of the invention may be made available at relatively low cost. Other features and advantages of the invention will become more readily understood from the following detailed description taken in connection with the appended claims and attached drawing in which the sole FIGURE is a diagrammatic representation of apparatus for expanding particulate volcanic ash particles in accordance with the invention.

In accordance with the invention, particulate volcanic ash shards are first classified and separated according to size. In the preferred embodiment the ash particles are classified and separated by conventional sieves. The particles which will pass through a 60 mesh screen and not pass through a 250 mesh screen are preferably selected although other sizes are also acceptable. It is preferred, however, that the particles be classified by size since the temperatures and residence times at expanding temperatures used in the expansion process described hereinafter may vary slightly according to the initial size of the particles being expanded.

In its naturally-occurring state, volcanic ash is in the form of irregularly-shaped glassy shards. Accordingly, the shards which pass through a 60 mesh screen may be larger than 0.01 inch in one dimension but will be less than 0.01 inch in at least one dimension. If the raw material is wet, it should be dried by conventional low temperature heating to contain less than about 15% water by weight.

In practicing the preferred method of the invention, particulate shards of volcanic ash are dropped through a substantially horizontally extending heated zone in an enclosed container wherein the pressure is maintained below atmospheric. Thereby, the individual particles are momentarily heated to a temperature between about 930° C. and 1100° C. and thereafter immediately cooled to a temperature below about 900° C. while suspended in a gaseous environment at reduced pressures. The glassy shards are softened by the heat and the entrapped gasses simultaneously expanded to form enclosed substantially spherical hollow bodies which cool to a temperature below the softening point of the glassy material before the sufficient mutual contact occurs to form agglomerations. Since the expansion occurs at reduced pressures and elevated temperatures, the glassy shards are rapidly softened and expanded to near maximum internal volume by entrapped gasses. Excess and surface gasses and interstitial water are driven from the particles so that the particles assume a near spherical monocellular shape. Upon cooling, the glassy spherical shell hardens and the internal gas pressure is reduced, thereby forming substantially spherical monocellular bodies with internal gas pressures well below atmospheric.

In the heating and cooling process, the shards are softened and gas trapped in the interior of the shard body expands. The shards thus become expanded hollow spherical bodies. Generally, the gas expansion causes most of the voids inside the softened body to merge and the softened body expands forming a monocellular hollow sphere. In some instances, however, the body may actually be ploycellular. For purposes of this invention, however, the actual number of cells inside the hollow body is not significant. Therefore, the expanded product, whether monocellular or containing particles which are actually polycellular, is referred to as monocellular. When the softened hollow body is cooled, the hollow spherical shell solidifies and the expanded gas trapped inside the cells is cooled to create a partial vacuum inside the individual spheres. Most of the spherical bodies formed from raw material in the 250 to 60 mesh size will pass through a 40 mesh screen after expansion.

The sole FIGURE illustrates apparatus for practicing the preferred process for expanding volcanic ash particles in accordance with the invention.

The apparatus comprises a fully enclosed vessel 10 with an inlet 11 at the top and an outlet 12 at the bottom. The bulk raw material 13, segregated, dried and classified as described hereinabove, is placed in a feed hopper 14 and fed into inlet 11 by metering roller-type valve 15. The material 13 thus drops through a funnel 16 into a heated zone.

A gas burner 17 is mounted within the vessel 10 on a horizontal bar 18 and projects a substantially horizontally extending flame 19 across the area directly below the funnel 16. The burner is preferrably adapted to project a flame which creates a heated zone about three to four inches deep, three to four inches long (horizontally) and extending the width of the funnel 16. This heated zone is maintained at about 930° C. to about 1100° C. The particles exiting the funnel 16 therefore must drop into and pass through the heated zone. After passing through the heated zone, the particles are rapidly cooled by falling through the unheated space below the flame and collected in the bottom of the vessel 10.

The vessel 10 is provided with a gas outlet 20, preferrably near the top of the vessel, which is connected with an exhaust blower 21. The exhaust blower 21 is operated to withdraw gas from the vessel and maintain a pressure within the vessel 10 which is less than atmospheric. Exhaust from the blower 21 is directed into a dust collector 22. Accordingly, bloated particles which are carried out of the vessel 10 through the gas outlet 20 are trapped in the dust collector 22.

The particles fall through the heated zone and collect in the bottom of the vessel 10. The bloated product 24 is removed continuously or as desired through outlet 12. Since the interior of the vessel 10 is maintained at reduced pressures, the outlet 12 is controlled by a metering roller-type valve 23. Metering rollers 15 and 23 must therefore produce effective gas-tight seals while metering material into and out of the vessel 10.

The temperature of the heated zone and the residence time of the volcanic ash shards in the heated zone must be carefully controlled. Furthermore, since the shards are softened and expanded while in the heated zone, the feed rate of bulk material should be somewhat limited so that the material is uniformly heated and not allowed to be densely packed while heated. In accordance with the invention the raw material is allowed to fall by gravity through a vertically extending flame 19. Accordingly, as the material passes through the flame each particle is rapidly and individually heated while flowing in a gaseous medium. Thus as the particles soften and expand, there is no packing force to cause the particles to agglomerate. When the softened expanded spheres exit the heated zone, they are immediately cooled below the softening point by the cooler environment and collected on the floor of the vessel. It will thus be observed that the heating and cooling occur consecutively while the particle is falling through the vessel 10 and the particles are cooled below about 900° C. before they are accumulated.

In the preferred embodiment of the invention, the burner 17 is mounted on a bar 18 which may be rotated to deviate the flame from the horizontal as shown in the drawing. When the heated zone is maintained between about 930° C. and 1100° C. and the vertical depth thereof is about three to about four inches, particles of particulate volcanic ash which are between about 250 and about 60 mesh size may be dropped directly through the heated zone. Under these conditions about 95% of the shards are softened and expanded to form enclosed hollow partially evacuated spheres which will pass through a 40 mesh screen. It will be observed that since the raw material is dropped through the flame, the residence time of the raw material is very short. If the particles are maintained in the heated zone too long, they tend to explode and form glassy flakes rather than evacuated spheres. If the residence time in the heated zone is too short, some of the shards are not expanded and/or the particles will not be expanded to the full volume available.

Residence time in the heated zone can be controlled by deviating the flame 19 from horizontal. By rotating the bar 18 so that the flame projects slightly downward (clockwise rotation as shown in the drawing) the residence time is decreased. Similarly, by rotating the bar 18 so that the flame 19 projects slightly upward (counterclockwise as shown in the drawing) the residence time is increased.

When the particulate raw material has been classified according to grain size and only particles between 250 and 60 mesh size are used, maximum bloating occurs when the flame is maintained essentially horizontal. Larger grain sizes require longer heating times and smaller grain sizes require shorter heating times. Thus the flame may be deviated from horizontal as required to maximize bloating of the particular particles being treated by rotation of bar 18.

In order to permit maximum expansion of gas trapped in the softened shards and therefore fully expand each individual particle, the enviornmental pressure inside the vessel 10 must be maintained below atmospheric during the heating and cooling process. Pressure reduction is accomplished by an exhaust blower 21 which draws gas from the vessel 10 through gas outlet 20. Since the vessel 10 is fully enclosed and sealed, exhaust blower 21 must be capable of withdrawing gas from the vessel at a greater rate than gas is admitted by leaks and generated by the burner. However, only a slight reduction in pressure is required. Reduced pressures in the range of about ten to fifteen millimeters of mercury are satisfactory. In the preferred embodiment, a water manometer is used and only about six inches of water (11.2 mm Hg) pressure reduction is required.

It will be observed that although only a slight reduction in environmental pressure is maintained, the particles expand in size from about five to fifteen times. Because of the spherical shape of the expanded bodies and because of the loss of vapors driven off by the heating process, the loose bulk density of the bloated product is in the range of from less than 0.5 to about 15 pounds per cubic foot.

As much as 95% or more of the raw material treated as described above is bloated in a single pass through the heated zone. Part of the un-bloated material is actually sand or other contaminants which will not bloat. However, since the bloated product is so light, it may be separated from the un-bloated material by an air classifier to yield a product which is essentially 100% expanded volcanic ash particles. If desired, the unbloated particles can be separated and recycled through the heated zone by conventional methods.

While the invention has been described with particular reference to expanding particles within the 250 to 60 mesh size, smaller and larger particles may be treated in similar fashion with the same apparatus by varying the temperature and/or residence time in the heated zone to produce similarly expanded product. It is to be understood, therefore, that although the invention has been described with particular reference to specific embodiments thereof, the forms of the invention shown and described in detail are to be taken as preferred embodiments thereof, and that various changes and modifications may be resorted to without departing from the spirit and scope of the invention as defined by the appended claims.

What is claimed:

1. The method of forming expanded hollow substantially spherical bodies of volcanic ash comprising the steps of
   (a) dropping particulate bodies of volcanic ash through a substantially horizontally extending flame to thereby momentarily heat said particulate bodies to a temperature between about 930° C. and about 1100° C.;
   (b) thereafter immediately cooling said particulate bodies to a temperature below about 900° C.; and
   (c) maintaining the environment surrounding said particulate bodies during said heating and cooling at a pressure less than atmospheric.

2. The method set forth in claim 1 wherein said particulate bodies of volcanic ash have a loose bulk density of about 40 to about 65 pounds per cubic foot and contain less than about 15% water by weight.

3. The method set forth in claim 1 wherein the environment surrounding said particulate bodies during said heating and cooling is maintained at a pressure of from about 10 to about 15 millimeters of mercury less than atmospheric.

* * * * *

UNITED STATES PATENT OFFICE
CERTIFICATE OF CORRECTION

Patent No. 4,238,430    Dated December 9, 1980

Inventor(s) Harold L. Phillips

It is certified that error appears in the above-identified patent and that said Letters Patent are hereby corrected as shown below:

On the title page, in the inventor's address, "Oochita" should read ---Cochita---

In Column 1, line 42, "iron sodium" should read ---iron, sodium---

In Column 2, line 60, "before the sufficient" should read ---before sufficient---

In Column 3, line 11, "ploycellular" should read ---polycellular---

Signed and Sealed this

Twenty-eighth Day of April 1981

[SEAL]

Attest:

RENE D. TEGTMEYER

Attesting Officer    Acting Commissioner of Patents and Trademarks